United States Patent
Zeffer et al.

[15] 3,701,500
[45] Oct. 31, 1972

[54] AIRCRAFT WHEEL WELL SEAL

[72] Inventors: Arthur A. Zeffer, Wadsworth, Ohio 44281; James A. Briscoe, Doylestown, Ohio 44230

[73] The B.F. Goodrich Company New York, N.Y.

[22] Filed: Oct. 16, 1970

[21] Appl. No.: 63,834

[52] U.S. Cl. .................................244/103 R, 49/477
[51] Int. Cl. ..........................................B64c 25/16
[58] Field of Search ...........244/103 R, 103 S, 102 R; 49/477

[56] References Cited

UNITED STATES PATENTS

| | | | |
|---|---|---|---|
| 3,410,508 | 11/1968 | Fisher | 244/102 R |
| 2,654,922 | 10/1953 | Krupp | 49/477 |
| 2,720,011 | 10/1955 | Krupp | 49/477 |
| 3,042,980 | 7/1962 | Brinsmade | 49/477 |

Primary Examiner—Milton Buchler
Assistant Examiner—Paul E. Sauberer
Attorney—John D. Haney and Harold S. Meyer

[57] ABSTRACT

An annular inflatable seal of resilient elastomeric material with the radially outer wall mounted in the wheel well and the radially inner wall spaced from the tire in the deflated condition. The walls of the seal are stretched during inflation so as to decrease the circumferential length of the radially inner wall and provide a wrinkle-free surface in engagement with the tire. Reinforcing cords are embedded in the seal to strengthen and control the stretching and contraction of the walls during inflation and deflation of the seal. The radially outer wall is attached to the wheel well in an area spaced from the edge of the seal to permit the edge portion to move radially inward during inflation and provide for increased radial movement of the radially inner wall.

14 Claims, 7 Drawing Figures

INVENTORS
ARTHUR A. ZEFFER
JAMES A. BRISCOE
BY John D. Haney
ATTY.

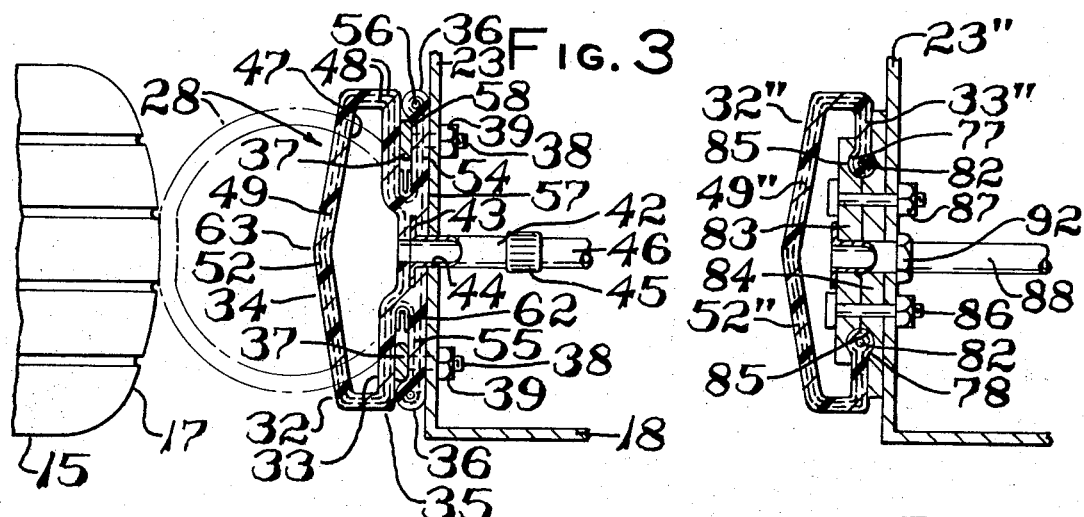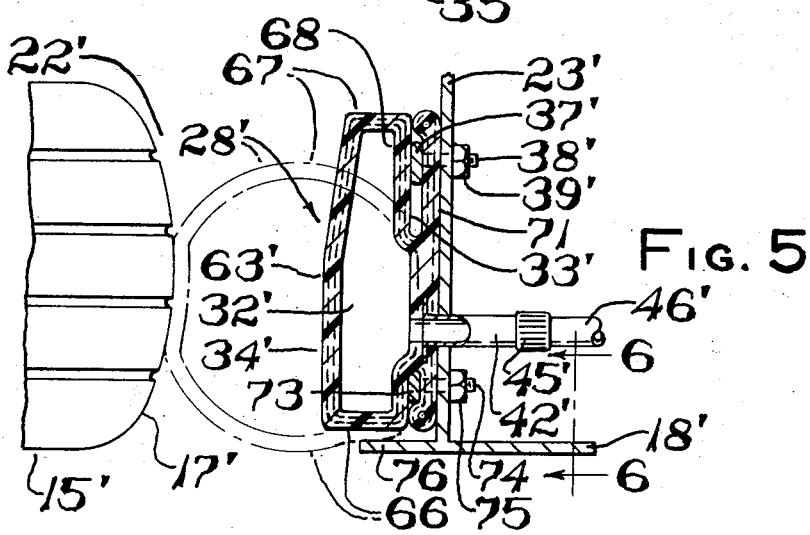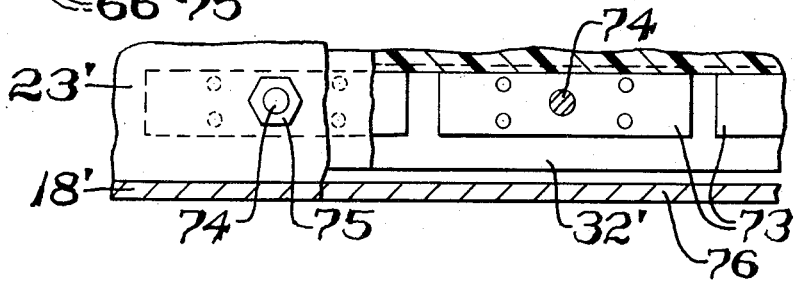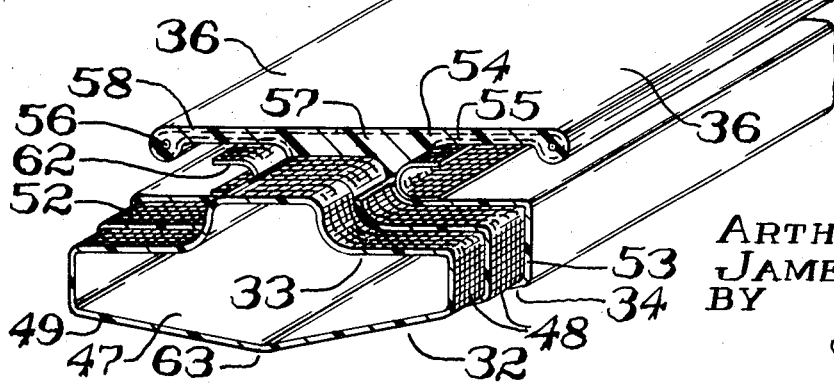
INVENTORS
ARTHUR A. ZEFFER
JAMES A. BRISCOE
BY John D. Haney
ATTY.

AIRCRAFT WHEEL WELL SEAL

BACKGROUND OF THE INVENTION

This invention relates to an inflatable closure or seal which is especially adapted for closing the space between the wheel well and the tire of an aircraft landing gear for those aircraft which do not utilize a wheel well cover to house the landing gear system. A closure is needed on such aircraft to reduce the aerodynamic drag which results from such an opening in the aircraft. Many aircraft use a wheel well cover assembly; however, the extra weight of the cover assembly and the mechanism for operating this assembly makes such an apparatus undesirable for some aircraft. This is especially true of small lightweight aircraft where the weight and the cost of the equipment are comparatively great when the total weight of the aircraft and the total cost of the aircraft are considered.

Heretofore, inflatable wheel well seal assemblies for closing the space between the wheel well and the tire have been designed and an example of such a seal is shown in U.S. Pat. No. 3,410,508 which is assigned to the assignee of this application. This patented seal is made up of a series of segmented inflated bags mounted on the wall of the wheel well. These bags are inflated into engagement with each other and with the tire to close the space between the wall of the wheel well and the tire. A vacuum is used to retract the bags so that the landing gear may be lowered and raised between the operating and stored positions. It has been found that when one of these bags requires maintenance it is difficult to replace the bag and of course the closure cannot be operated with one of the bags removed or punctured. It has also been found that it requires considerable time and skill to manufacture and install a closure having a number of inflatable segments.

One of the reasons multiple inflatable segments were used to make the closure described above is because of the difficulty in making a one-piece inflatable closure which will move radially inward the necessary distance to contact the tire without producing wrinkles or folds in the sealing surface which engages the tire tread. This is a unique problem when it is recognized that the sealing face must move radially inward 3½ to 4 inches to contact the tire since the landing gear system requires this clearance to safely move the wheel and tire into and out of the wheel well.

Another problem with the inflatable seals used heretofore has been the requirement of a vacuum system to deflate the closure and move it out of the way during lowering and raising of the landing gear. A vacuum system also adds weight and costs and is especially undesirable for smaller aircraft.

SUMMARY OF THE INVENTION

The aircraft wheel well seal of this invention provides a one-piece inflatable closure in which the sealing surface is movable radially a substantial distance into engagement with the tread and at the same time maintains a smooth sealing face. The closure also returns to the retracted deflated condition without the need of a vacuum.

The construction of this invention is such that as the sealing surface is moved radially inward towards the tire tread, the radially inner wall is stretched radially while the sealing surface is contracted circumferentially to maintain a smooth surface. Reinforcing cords adhered to and embedded in the inflatable closure control the stretching and contraction of the walls as well as strengthen the closure to withstand aerodynamic stresses during flight.

The resilient elastomeric material of which the closure is made is disposed in such a manner that during inflation the resistance to movement of the inner wall into engagement with the tire is kept at a minimum so that expansion will take place at pressures on the order of 8 pounds per square inch or less for small aircraft. Then upon deflation of the closure the resilient nature of the elastomeric material is such that the closure is moved back into the retracted position quickly without the need of other means such as a vacuum.

The closure of this invention is also of simple construction providing for ease of manufacture and maintenance. The installation and removal of the closure may be accomplished with dispatch providing for a minimum of down time and requiring only ordinary skills of a mechanic.

The accompanying drawings show one preferred form and two modifications of an aircraft wheel well seal made in accordance with and embodying this invention and which is representative of how this invention may be practiced.

BRIEF DESCRIPTION OF THE DRAWINGS

In the drawings:

FIG. 3 is a sectional view taken along the plane of line 3—3 of FIG. 2 showing the seal in the inflated condition in dot-dash lines and in the deflated condition in full lines.

FIG. 4 is a fragmentary view in perspective of a cutaway portion of the seal showing the reinforcing cord fabric construction.

FIG. 5 is a sectional view, like FIG. 3, of a modified form of seal embodying the invention.

FIG. 6 is a fragmentary sectional view of a cutaway portion of the wheel well seal assembly taken along the plane of line 6—6 of FIG. 5, parts being broken away.

FIG. 7 is a fragmentary sectional view like FIG. 3 of a modified form of seal embodying the invention in the deflated condition.

DETAILED DESCRIPTION

Figure 1:
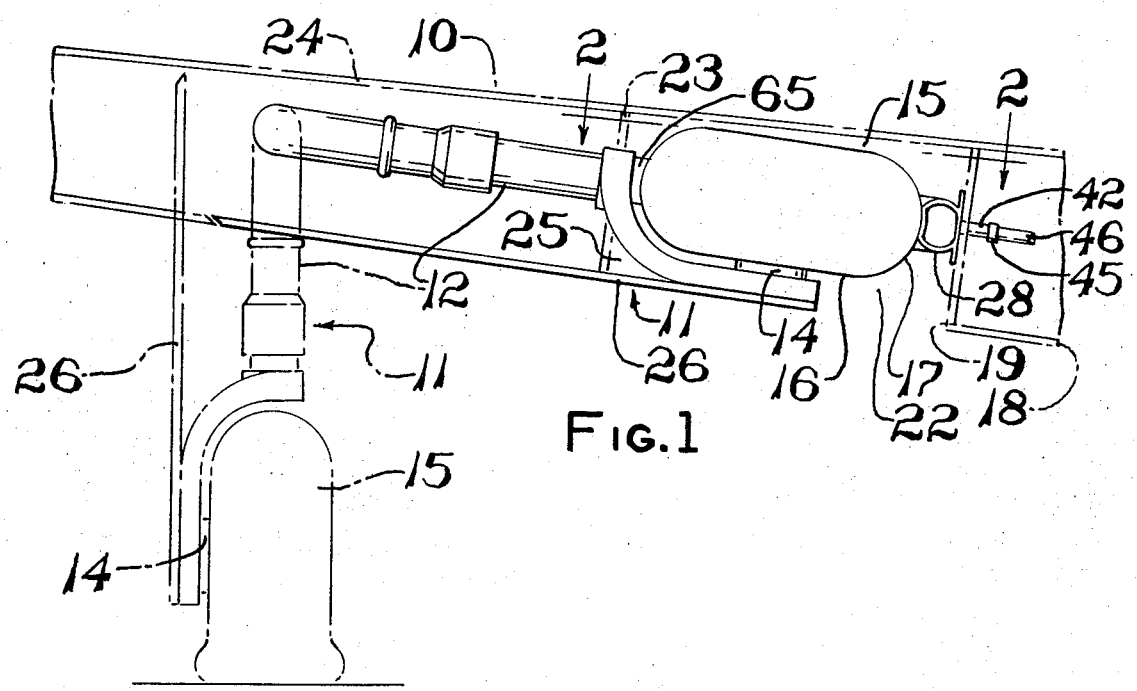
FIG. 1 is a front elevation of a landing gear assembly and wheel well in an aircraft wing showing the landing gear in its extended position in dot-dash lines and in its retracted position in full lines.

Referring to FIG. 1, an aircraft wing 10 is shown on which a landing gear assembly 11 is swingably mounted for movement between the retracted position shown in full lines and the dropped position shown in dot-dash lines. The landing gear assembly 11 has a strut 12 pivotally connected to the aircraft wing 10 for supporting a wheel 13, shown in FIG. 2, on an axle 14. The wheel carries a tire 15 having a sidewall portion 16 and a tread portion 17.

Figure 2:
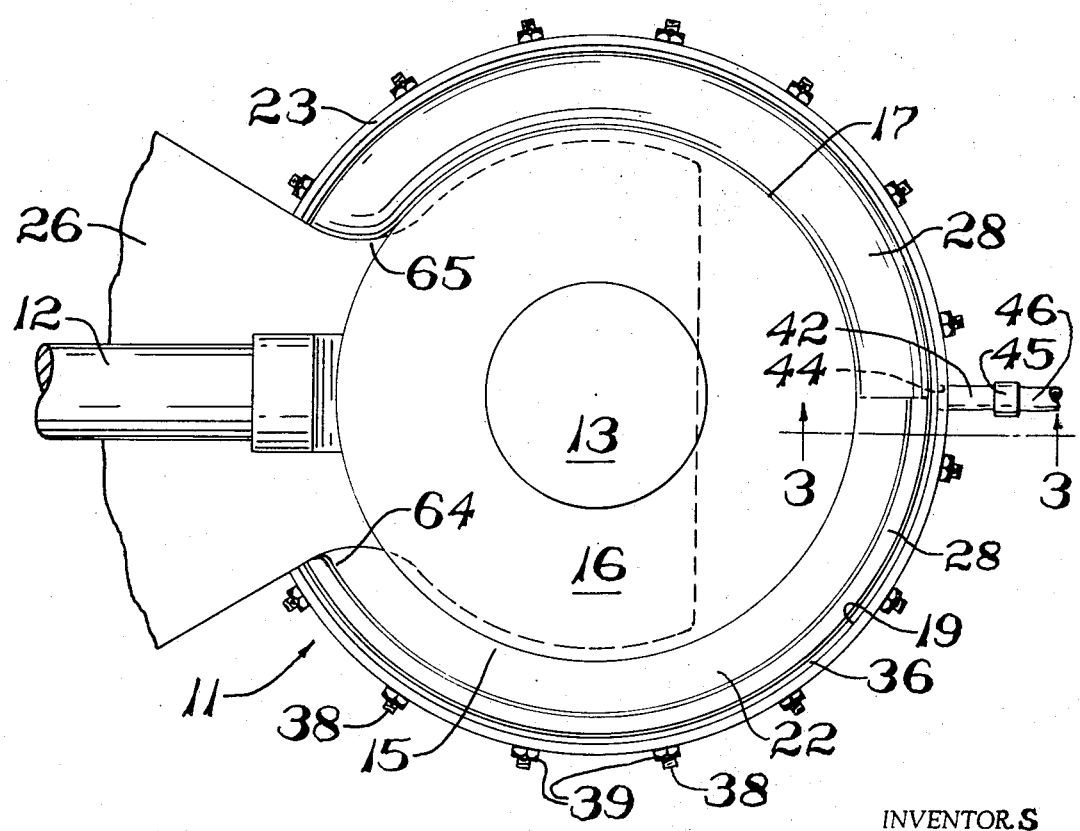
FIG. 2 is a sectional view of the landing gear and wheel well taken along the plane of line 2—2 of FIG. 1 showing one-half of the seal in the inflated condition and the other half in the deflated condition.

The aircraft wing 10 has a bottom member of sheet metal or other suitable material 18 in which there is an opening 19 to a wheel well 22 having a wall or ring-shaped band 23 extending between the bottom member 18 and a top member 24 of the aircraft wing 10 to provide a cavity 25 in the wing for receiving the landing gear assembly 11 in the retracted condition. As shown in FIGS. 1 and 2, a sheet metal cowling 26 fits into an opening 27 in the bottom member 18 of the wing 10 for covering the strut 12 in the retracted condition of the landing gear assembly 11 and extends over the strut to partially cover the opening 19 in the bottom member 18.

An inflatable apparatus or closure seal 28 is mounted in the wheel well 22 for closing the space between the band 23 and the tread portion 17 of the tire 15. As shown more clearly in FIGS. 2, 3 and 4, a hollow annular body 32 of resilient elastomeric material such as silicone rubber or other rubberlike material extends circumferentially around the wheel well 22 at the band 23 from one edge to the other edge of the cowling 26. The annular body 32 has a radially outer wall 33 and a radially inner wall 34 which are connected by edge portions 35.

Cylindrical extensions 36 project from an area of the radially outer wall 33 spaced from the edges of the annular body 32 and overlap the edge portions 35. Fastening strips 37 of sheet metal or other suitable material are interposed between the cylindrical extension 36 and the edge portions 35 for clamping the cylindrical extension to the band 23. Machine screws 38 or other suitable fasteners extend through openings in the fastening strips 37 and cylindrical extensions 36 and then through openings in the band 23 where clamping action is provided by nuts 39. As shown in FIG. 2, these screws 38 and nuts 39 are spaced at equidistant positions around the band 23 of the wheel well 22 to securely hold the annular body 32 in position.

In order to inflate and deflate the annular body 32, a tubular member 42 having a flange 43 embedded in the radially outer wall 33 extends radially outward through an opening 44 in the band 23 where it is connected by a suitable coupling 45 to a conduit 46 which is connected to a source of air pressure such as an air pump (not shown) on the aircraft and through valves (not shown) for opening the conduit 46 to atmospheric pressure for deflating the body 32 and to the air pump for inflating the body.

Referring to FIG. 4, the construction of the annular body 32 is shown in more detail. An inner tubular member 47 of resilient elastomeric material such as silicone rubber has a greater thickness in the radially outer wall 33 and edge portions 35 than in the radially inner wall 34 to decrease the pressure necessary to expand and stretch the inner wall 34 and to increase the resilient action for quickly returning the annular body 32 to the disengaged position upon deflation of the body. Reinforcing cords 48 which may be stretch cords having a core of elastomeric material wrapped in strands of textile material are embedded in and adhered to the elastomeric material of the annular body 32. The cords 48 extend through a square woven fabric in a direction circumferentially of the annular body 32 and radially of the annular body 32. Two plies 49 and 52 of this material are wrapped around the tubular member 47 for controlling the stretching and contraction of the radially outer wall 37, radially inner wall 34 and edge portions 35. A second layer 53 of silicone rubber covers the plies 52 and may be of greater thickness at the radially outer wall 33 and edge portions 35 than in the radially inner wall 34 to provide the action described for the tubular member 47 hereinbefore.

Each of the cylindrical extensions 36 have layers of reinforcing textile plies 54 and 55 wrapped around a bead which may be of nylon cord 56 and are covered by an inner layer 57 and an outer layer 58 of silicone rubber. In the V-shaped groove where the cylindrical extensions 36 join the annular body 32, a reinforcing tape 62 of textile material may be adhered to the inner layer 57 and the second layer 53 of the annular body 32 to distribute the stresses and prevent peeling in this area.

Preferably the radially outer wall 33 has a substantially cylindrical configuration; however, as shown in FIGS. 3 and 4, the radially inner wall 34 has a greater diameter at the edge portions 35 than at the center portion 63 to provide a greater area which can be expanded into the configuration shown in the dot-dash lines in FIG. 3 and as shown in the upper half of FIG. 2.

The annular body 32 may be built by laying the components shown in FIG. 4 around a mandrel having the shape of the cavity in the body and then vulcanizing the material into a unitary structure having a cross section as shown in full lines in FIG. 3 for the deflated condition of the inflatable seal 28. The annular body 32 can then be mounted on the ring-shaped band of the wheel well 22 by clamping the cylindrical extensions 36 against the band using the fastening strips 37, machine screws 38 and nuts 39. The tubular member 42 is then attached to the conduit 46 by coupling 45 after which the inflatable seal is ready for operation. As shown in FIG. 1, the landing gear assembly 11 is swingable from the dropped or operating position shown in dot-dash lines to the retracted position shown in full lines in the wheel well 22. During this swinging operation or retracting operation, the annular body 32 is in the deflated condition providing clearance for the landing gear assembly including the tire 15 to enter the wheel well 22. After the landing gear assembly 11 is retracted, air pressure is introduced through the tubular member 42 into the annular body 32 causing it to expand radially inward into engagement with the tread portion 17 and closing the space between the band 23 and the tire 15. The annular body 32 has end portions 64 and 65 which are also expandable into engagement with the edges of the cowling 26 to provide complete closing of the cavity 25 in the wheel well 22 which effectively reduces the aero-dynamic drag at the wheel well 22.

During expansion of the annular body 32 the radially inner wall 34, radially outer wall 33 and edge portions 35 are stretched into the shape shown in FIGS. 2 and 3 and during this stretching the sealing surface at the center portion 63 of the radially inner wall 34 is contracted from a circumferential length, shown in the bottom half of FIG. 2, to a shorter circumferential length, shown in the upper half of FIG. 2, whereby the sealing surface which engages the tread portion 17 and is approximately one-half inch to 1 inch wide is smooth and contains no folds or wrinkles.

When the aircraft is ready for landing, the inflating air of other fluid is permitted to escape through passage 42 and conduit 46 to the atmosphere and the resilient action of the elastomeric material of the annular body 32 and the elastomeric material in the reinforcing cords 48 returns the inflatable seal 28 to the deflated condition shown in full lines in FIG. 3 and in the bottom half of FIG. 2. The inflatable seal 28 can be removed for repair or replacement by removing the machine screws 38 and nuts 39 permitting the cylindrical extensions 36 to be pulled away from the band 23 of the wheel well 22 and then removed after the tubular body 42 is uncoupled from the conduit 46 at coupling 45.

A modified inflatable seal 28' is shown in FIG. 5 in which the expansion of the annular body 32' takes place to one side and towards the bottom of the cavity 25 of the wheel well 22'. The radially inner wall 34' has the same diameter from the center portion 63' to a bottom edge 66 with an increased diameter in the deflated condition at an upper edge 67. Furthermore, the radially outer wall 33' has an upper edge portion 68 overlapping a cylindrical extension 71 and joining with the cylindrical extension in an area under the center portion 63' of the inner wall 34'. The cylindrical extension 71 is clamped to the ring-shaped band 23' of the wheel well 22' by machine screws 38' and nuts 39' clamping fastening strips 37' against the band. At the opposite or bottom edge portion 66 of the outer wall 33', segmental metal strips 73, shown in greater detail in FIG. 6, are embedded in and adhered to the resilient elastomeric material of the body 32'. Studs 74 mounted in the metal strips 73 extend radially outward through openings in the band 23' and nuts 75 are threaded on the studs to clamp the metal strips to the band 23'. The tubular member 42' may therefore be mounted and adhered to the radially outer wall 33' in an off-center position between the center portion 63' and the bottom edge portion 66. This tubular member 42' may be fastened to a conduit 46' by a coupling 45' for passage of air into and out of the annular body 32'. It will be noted that in FIG. 5, the bottom member 18' has a flange portion 76 which extends radially inward into the opening 19 to partially cover the bottom edge portion 65 of the annular body 32' in the deflated condition. With the construction shown in FIGS. 5 and 6 and described hereinabove, it will be seen that upon expansion of the inflatable seal 28' the radially inner wall 34' and radially outer wall 33' will be stretched and moved radially as well as downward or to the right, as shown in FIG. 5, to engage the tire tread 17' in a position to one side of the centerline and thereby reduce the open space between the band 23' and tire 15'. The bottom edge portion 65 will also be urged into engagement with the flange 76 and thereby reduce the aerodynamic drag during flight.

A further modification is shown in FIG. 7 wherein a different method of attaching the annular body 32'' to the ring-shaped band 23'' of the wheel well 22'' is shown. In this modification, the radially outer wall 33'' terminates in beaded edges 77 and 78 in which the plies 49'' and 52'' are wrapped around a bead 82 which may be of nylon cord. The beaded edges 77 and 78 are clamped between an inner plate 83 and an outer plate 84 which have grooves 85 for receiving the beaded edges. Screws 86 extend through the inner plate 83, the outer plate 84 and the band 23' of the wheel well 22 and hold the plate and the band together by nuts 87 threaded on the radially outer ends of the screws.

As shown in FIG. 7, a flanged tubular member 88 extends through the inner plate 83, outer plate 84 and an opening for passage of air into and out of the annular body 32'' and is held in place by a nut 92.

While certain representative embodiments and details have been shown for the purpose of illustrating the invention, it will be apparent to those skilled in the art that various changes and modifications may be made therein without departing from the spirit or scope of the invention.

We claim:

1. An inflatable seal for closing the space between a wheel well and an aircraft tire comprising an annular body of resilient elastomeric material, said annular body having a radially outer wall for attachment to the wheel well, a radially inner wall for radial movement into engagement with the tread of said tire, said outer wall being mounted on said wheel well at a position spaced from an edge of said body to provide an edge portion which is radially movable upon inflation whereby additional radial movement of said inner wall is provided to close the space between said wheel well and said tire and said radially outer wall being attached to said wheel well by a substantially cylindrical extension overlapping said edge portion for fastening to said wheel well.

2. An inflatable seal according to claim 1 wherein reinforcing cords are embedded in and adhered to the elastomeric material of said body for controlling the stretching and contraction of said inner wall, said outer wall and said edge portion.

3. An inflatable seal according to claim 2 wherein said reinforcing cords are stretch cords having a core of elastomeric material wrapped in strands of textile material.

4. An inflatable seal according to claim 3 wherein said cords are woven into a square woven fabric with said cords extending substantially circumferentially and radially of said body.

5. An inflatable seal according to claim 1 wherein the thickness of said outer wall and said edge portion is greater than the thickness of said radially inner wall whereby the inflation pressure necessary for expanding said inner wall is minimized and the resiliency of said outer wall and said edge portion is sufficient to disengage said inner wall from said tire upon deflation of said body and move it radially outward away from said tire.

6. An inflatable seal according to claim 1 wherein said inner wall has a greater diameter at the edges of said body than at the center whereby additional radial movement of said inner wall is provided to close the space between said wheel well and said tire.

7. An inflatable seal according to claim 1 wherein said radially outer wall is attached to the wheel well in an area spaced from both edges of said body whereby both edge portions of the walls are movable radially inward during inflation.

8. An inflatable seal according to claim 1 wherein reinforcing cords are embedded in and adhered to the elastomeric material of said body and a reinforcing fabric is adhered to said body in a groove between said extension and said radially outer wall whereby stresses at this groove are distributed over a larger area of said body to prevent peeling at said groove.

9. An inflatable seal for closing the space between a wheel well and an aircraft tire comprising an annular body of resilient elastomeric material, said annular body having a radially outer wall for attachment to the wheel well, a radially inner wall for radial movement into engagement with the tread of said tire, said outer wall being mounted on said wheel well at a position spaced from an edge of said body to provide an edge portion which is radially movable upon inflation whereby additional radial movement of said inner wall is provided to close the space between said wheel well and said tire, said radially outer wall being clamped between inner and outer plates at said position spaced from an edge of said wall, said outer wall terminating in an enlarged beaded edge clamped in sealing engagement between said inner and outer plates and fastening means for attaching said inner and outer plates to said wheel well.

10. An inflatable seal according to claim 9 wherein reinforcing cords are embedded in and adhered to the elastomeric material of said body, said beaded edge having a circumferentially extending bead and said reinforcing cords being wrapped around said bead for clamping by said inner and outer plates.

11. An inflatable seal for closing the space between a wheel well and an aircraft tire comprising an annular body of resilient elastomeric material, said annular body having a radially outer wall for attachment to the wheel well, a radially inner wall for radial movement into engagement with the tread of said tire, said outer wall being mounted on said wheel well at a position spaced from an edge of said body to provide an edge portion which is radially movable upon inflation whereby additional radial movement of said inner wall is provided to close the space between said wheel well and said tire and a second edge portion of said annular body fixedly attached to the wheel well whereby a substantially radially extending wall is provided in the inflated condition at the side of said body containing said second edge portion.

12. An inflatable seal according to claim 11 wherein said second edge portion has a metal reinforcing plate member embedded therein and studs extending radially outwardly from said plate members for fastening to the wheel well.

13. An inflatable seal according to claim 12 wherein said outer wall has a substantially cylindrical extension overlapping said edge portion which is radially movable upon inflation for fastening to the wheel well.

14. An inflatable seal for closing the space between a ring-shaped band and a central member radially inward of said ring-shaped band comprising an annular body of resilient elastomeric material, said annular body having a radially outer wall for attachment to said ring-shaped band, a radially inner wall for radial movement into engagement with the radially outer surface of said central member, said outer wall being mounted on said ring-shaped band at a position spaced from an edge of said body to provide an edge portion which is radially movable upon inflation whereby additional radial movement of said inner wall is provided to close the space between said ring-shaped band and said central member, said radially outer wall being attached to said ring-shaped band by a substantially cylindrical extension overlapping said edge portion for fastening to said ring-shaped band.

* * * * *